July 24, 1951 — W. A. ANDERSON — 2,561,552
POWER CARRIAGE RETURN MECHANISM AND SAFETY FEATURES
Filed April 14, 1948 — 4 Sheets-Sheet 1
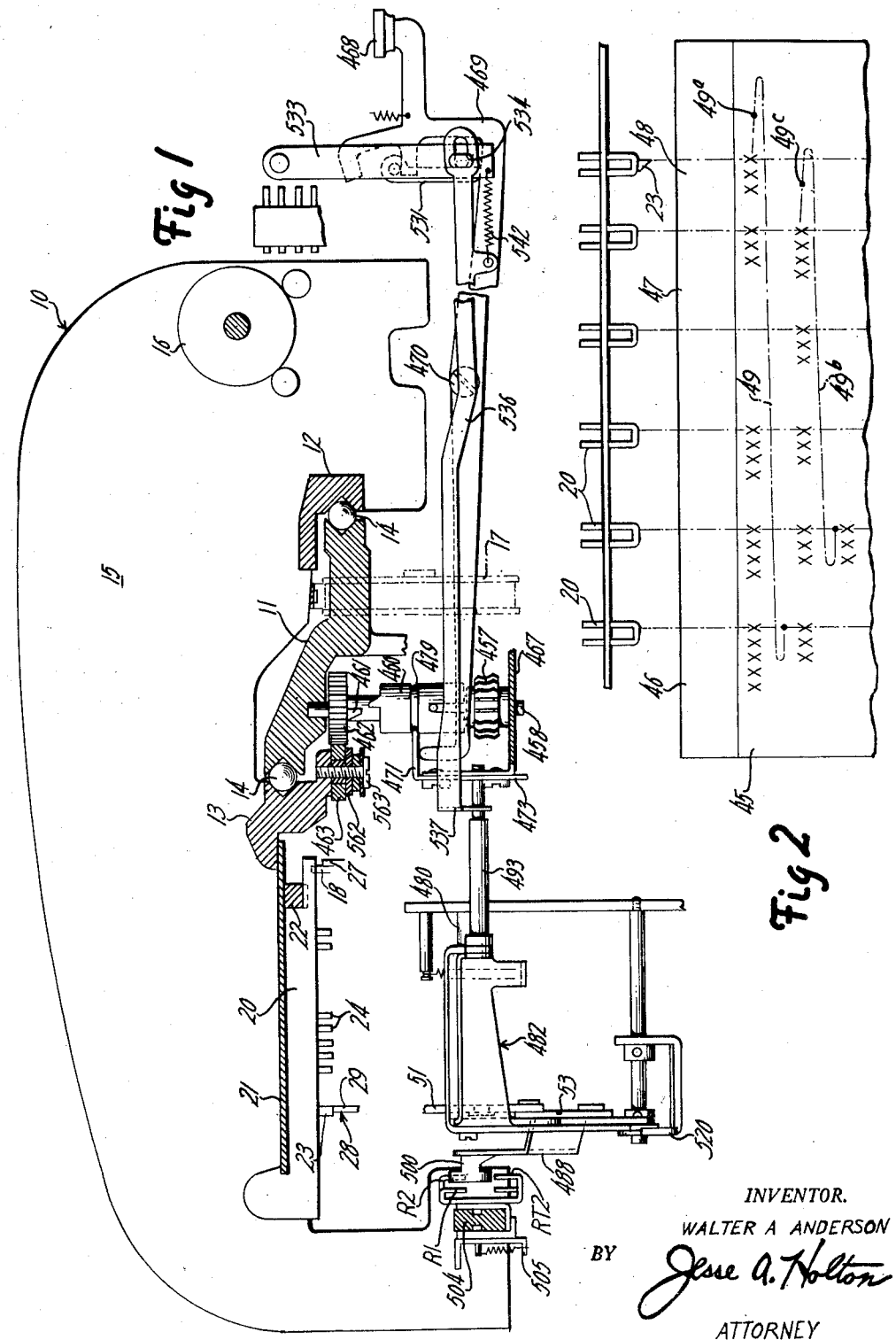
INVENTOR.
WALTER A. ANDERSON
BY Jesse A. Holton
ATTORNEY

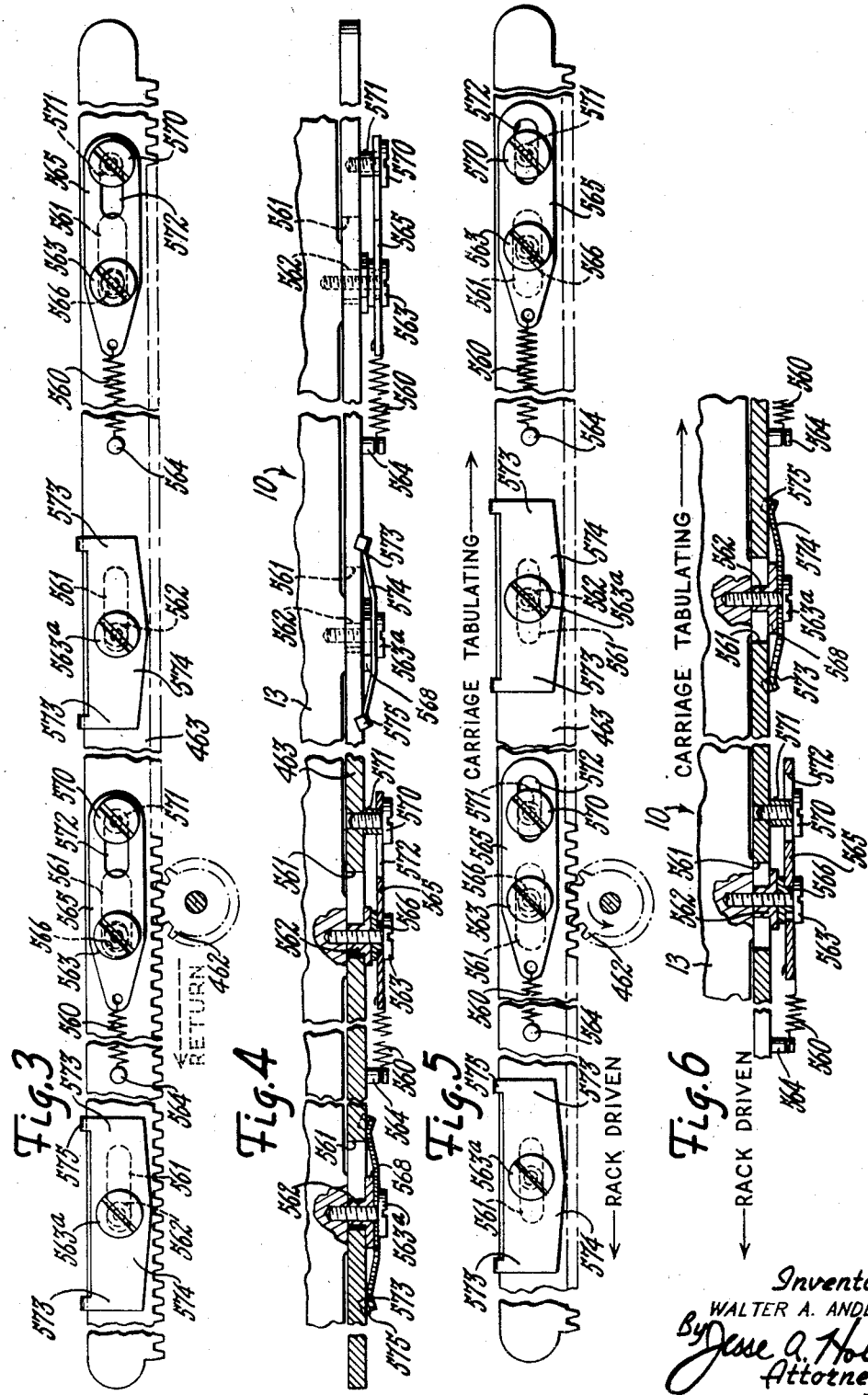

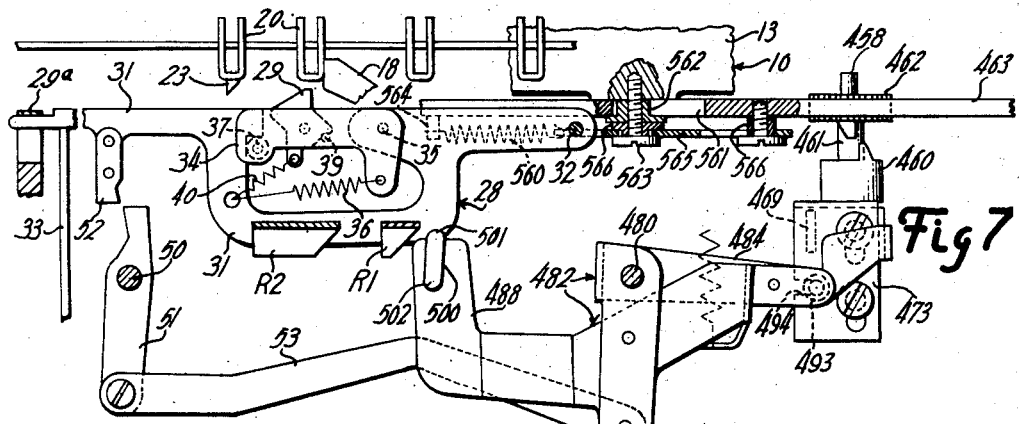
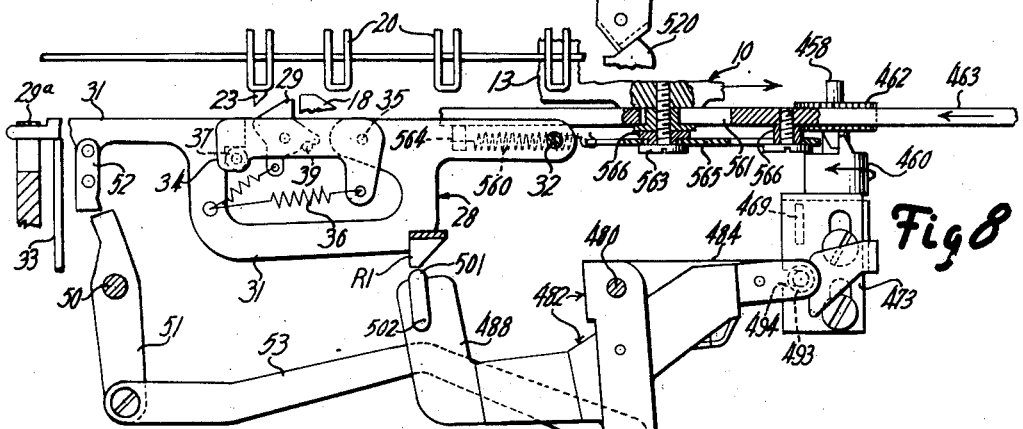
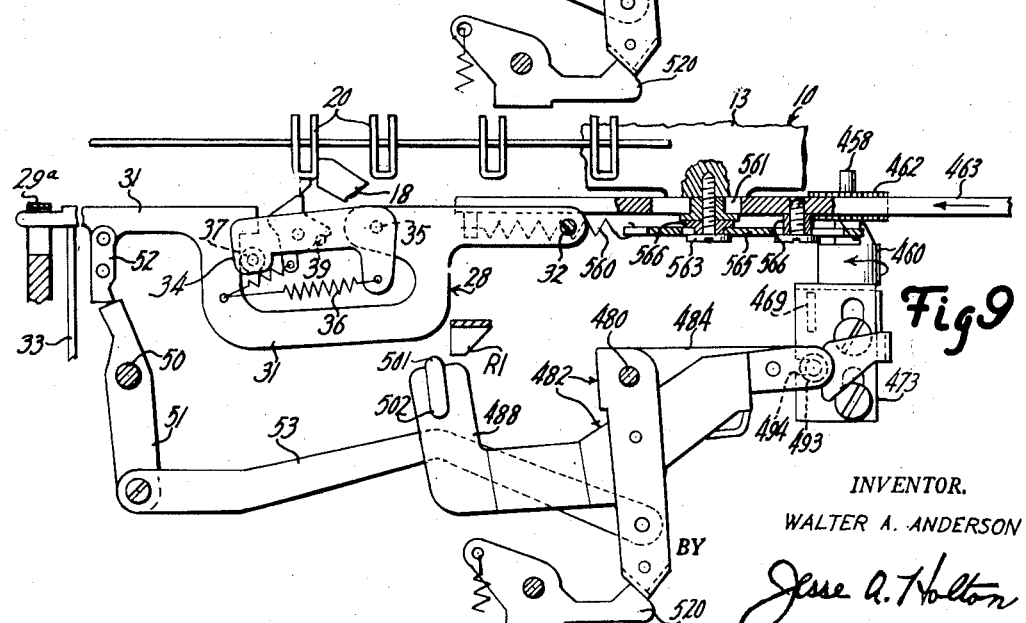

July 24, 1951
W. A. ANDERSON
2,561,552
POWER CARRIAGE RETURN MECHANISM AND SAFETY FEATURES
Filed April 14, 1948
4 Sheets-Sheet 4
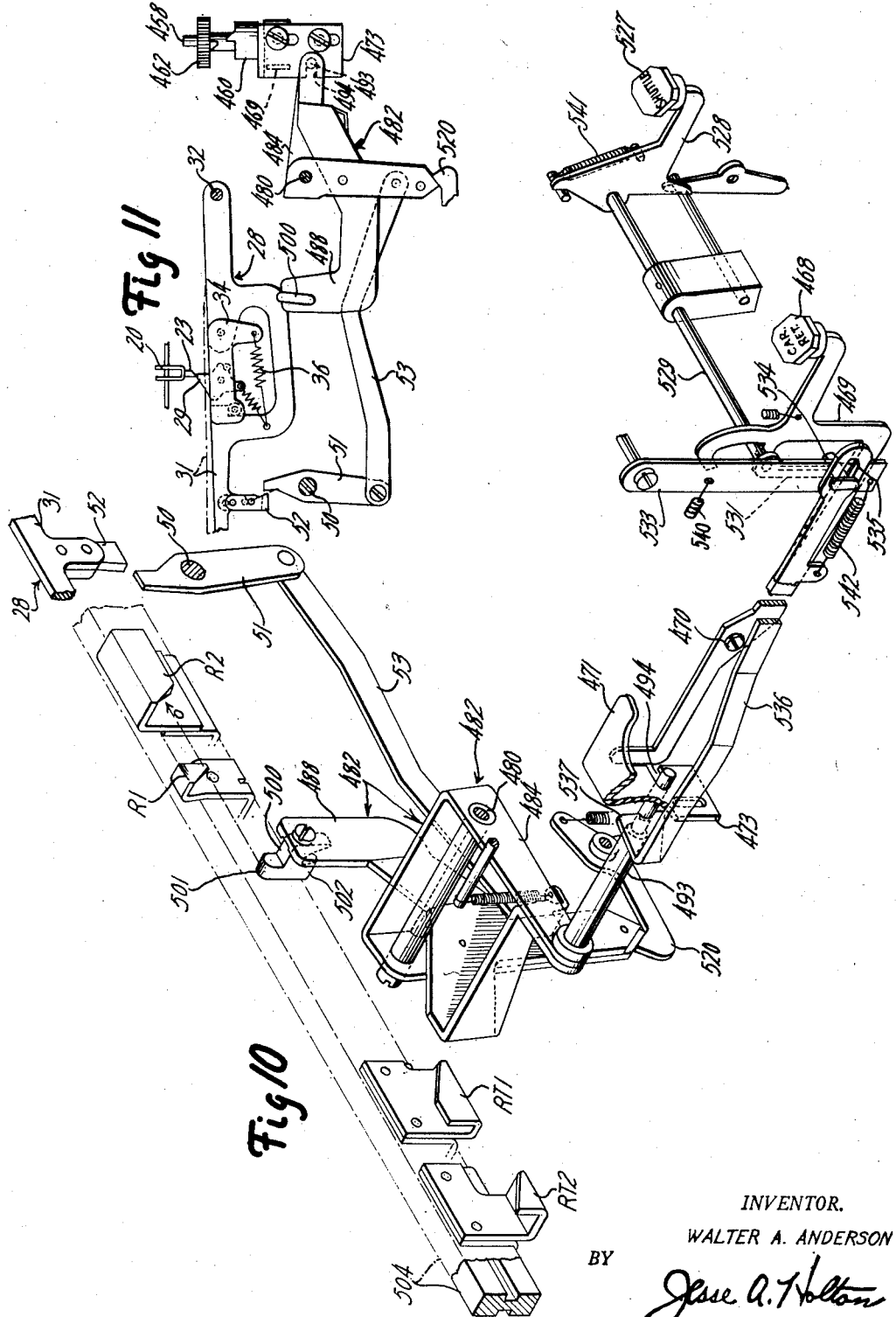
INVENTOR.
WALTER A. ANDERSON
BY
Jesse A. Holton
ATTORNEY Patented July 24, 1951

2,561,552

UNITED STATES PATENT OFFICE 2,561,552

POWER CARRIAGE RETURN MECHANISM AND SAFETY FEATURES

Walter A. Anderson, Bridgeport, Conn., assignor to Underwood Corporation, New York, N. Y., a corporation of Delaware Application April 14, 1948, Serial No. 20,888

16 Claims. (Cl. 197—66)

This invention is a continuation in part of application No. 679,722, filed June 27, 1946, now Patent No. 2,536,524, dated January 2, 1951, and relates in general to power-driven carriage return mechanisms for business machines, and particularly to provision for softly starting the carriage on its return movements, and to certain safety features in connection with power cycling the machine and power-returning the carriage.

It is one object of the invention to provide an efficient power-driven carriage return mechanism including efficient means for softened or shockless pick-up of the carriage during carriage returning operation.

It is a further object of the invention in connection with power-returning the carriage to provide efficient means to soften also the shock of picking up the carriage should it at the time of carriage return institution be executing a tabulating run.

The structure of the invention provides for impartation of power-return motion to the carriage through the medium of elastic means, so that when a tabulating run of the carriage is to be interrupted and followed by a power-return thereof, the conditioning of the power-return mechanism will not immediately reverse the movement of the carriage, but will become effectively active only after said elastic means has been strained sufficiently to overcome the tabulating inertia of the carriage.

This tabulating movement of the carriage which takes place during the straining of the elastic means may be sufficient to institute an automatic machine cycle under conventional tappet control of the carriage and approximately at the time when the carriage begins to receive its power-return motion. This is undesirable inasmuch as the machine is not required to cycle at this time, and, moreover, since a machine cycle under certain circumstances may give troublesome results, such as a complete lock-up of the machine and consequent damage to parts of the machine.

It is therefore another object of the invention to provide in association with shock-less carriage return provision, efficient means to prevent cycling of the machine while the carriage is executing a power-return.

Furthermore, it is an object to provide simple and efficient means which under all circumstances will negative the possibility of a concomitant carriage return run and a machine cycle.

The invention has been applied to a well-known Sundstrand accounting machine, the fundamental features of which are disclosed in the patents to Sundstrand, Nos. 2,194,270 and 2,209,240, dated respectively, March 19, 1940, and July 23, 1940, and some improved features of which are shown in said application of which this application is a continuation in part.

Referring now to the drawings—

Figure 1 is a side sectional view of the upper portion of a Sundstrand accounting machine embodying the invention, and including a paper-supporting carriage, Figure 2 is a diagrammatic view showing a work-sheet and related carriage-supported function control magazines, Figure 3 is a bottom view of a carriage return rack and a driving gear, and a novel shock-cushioning provision associated therewith. The front of the machine is facing the reader and the parts are shown in their normal relations, Figure 4 is a frontal view of the mechanism seen in Figure 3, with the parts also illustrated in their normal relations, Figure 5 is a bottom view similar to Figure 3 but the carriage return rack is shown in the process of picking up the carriage with a lag, through the intermediary of elastic means, Figure 6 is a front fragmentary representation of some of the parts illustrated in Figure 5 in the same position, Figure 7 is a sectional rear view showing the carriage return mechanism of the invention in a normal, ineffective condition, the carriage being held in one of the columnar positions by one of the function control magazines 20, Figure 8 is an illustration similar to Figure 7, but the carriage is shown in the process of executing a taubulating movement, and a carriage return clutch is shown as having been closed incidental to such tabulating movement, and with the result of blocking or incapacitating the usual cycle instituting mechanism, Figure 9 is a view similar to Figures 7 and 8 showing the carriage advanced in its tabulating movement to a cycle instituting position, the carriage return clutch during such carriage advancement having become closed and the automatic cycle instituting means having consequently become incapacitated, Figure 10 is a fragmentary front perspective view looking downward from the left onto the carriage return control mechanism in its normal condition, Figure 11 is a fragmentary rear view similar to Figure 7, showing the carriage return control mechanism blocked against return instituting movement, by carriage operation of the cycle instituting means.

Referring now to Figure 1, a carriage generally designated by the reference character 10 is mounted to ride on a frame supported track member 11 by means of front and rear carriage rails 12 and 13 respectively, which have guideway communication with said track member 11 by means including anti-friction elements 14. Said carriage 10 includes widely spaced end plates 15 wherebetween there extends a work-sheet supporting platen 16.

The carriage is constantly urged leftwardly under the tension of a spring-drum and drawband device designated by the numeral 17, in a conventional manner. A usual tabulating dog 18, in conjunction with any one of several function control magazines 20 on the carriage, is instrumental to hold the carriage normally in one of a number of possible columnar positions. Said control magazines are of conventional structure and are adjustably carried on the carriage 10 by means including a plate 21 and a rack 22 that are coextensive with the carriage. The individual magazines 20 carry cycle instituting tappets 23 and various other function controlling tappets 24, as may be called for in satisfaction of different accounting applications.

The tabulating dog 18 is part of a tabulating escapement including also a holding dog 27 which is normally located below the traveling path of the magazines 20, see Figure 1. During each cycle, or as a result of an operation of a tabulator key, not shown, said escapement dogs 18 and 27 are first respectively lowered and raised, and then restored in a manner well known, and disclosed in said Patent No. 2,194,270, thereby to free the active control magazine 20 for a tabulating movement of the carriage under action of said drawband device 17, and subsequent interception of the carriage in the location corresponding to the next columnar position defined by a control magazine 20.

As any magazine 20 having a cycle instituting tappet 23 approaches the tabulating dog 18 during a tabulation, it is adapted to depress a cycle instituting selector 28 of conventional structure, situated on the stationary part of the machine. This selector comprises a cam element 29 for downward camming contact by whatever tappets 23 that may be provided, such contact being made during tabulating advance of the carriage, thereby to operate a lever 31 pivoted at 32. The swinging end of the lever 31 overlies a vertically disposed rod 33 of a conventional mechanism, not further shown, which is effective upon depression of the lever 31 to trip the machine cycling mechanism. Said conventional mechanism is spring restored for the rod 33 to press normally the lever 31 upwardly into contact with an abutment 29a, as seen in Figure 7. Operation of the lever 31 is effected impositively by providing the cam element 29 not directly on the lever 31, but on an arm 34 that is pivotally carried on the lever 31, as at 35. A spring 36 between the lever 31 and the arm 34 serves to yieldingly transmit cycle instituting motion from the arm 34 to the lever 31. The normal relation between the arm 34 and the lever 31 is established by an abutment provision therebetween, as at 37, see Figure 7.

It will be seen that if for any reason the lever 31 should be blocked against depression, the cycle instituting tappet 23 is capable of passing over the cam element 29 idly, the arm 34 being merely yielding upon the lever 31. The cam element 29 is pivotally supported upon the arm 34, and a stop 39 and a spring 40 provide that it will be effectively operated by a tappet 23 only during advance movement of the carriage.

Power return mechanism for carriage

The work-sheet-supporting carriage 10 may be caused to return under the power of the same elecric motor, not shown, that cycles also the machine, and power-returns of the carriage may be instituted either automatically under control of the carriage or under manual control.

Referring more particularly to Figure 1, the machine includes a vertically disposed shaft 458 which at its lower end has fast thereon worm gear 457 that is constantly driven by said motor while the machine is in operation. Slidably splined for vertical movement on said shaft 458 is a toothed clutch member 460 for engagement with another toothed clutch member 461 which is integral with a gear 462. This gear is rotatatively loose on the shaft 458 and in constant mesh with a carriage return rack 463. Said clutch members 460 and 461 are normally separated, as shown in Figures 1 and 7, so that the gear 462 is idly in mesh with the carriage return rack 463. The latter is carried on the underside of the carriage rail 13, and the shaft 458 has a pivotal bearing at its upper end in the frame supported track member 11, and at its lower end in a frame supported shelf 467.

The clutch member 460 may be shifted into cooperative relation with the clutch member 461 by a depression of a carriage return key 468, see Figure 10, which is part of a lever 469 that is pivoted at 470, and has its rear end underlie a horizontal part 471 of a clutch closing slide 473 supported for vertical movement on the framework of the machine. The aforesaid part 471 is in communication with an annular groove 479 in the clutch member 460, wherefore operation of the carriage return key 468 results in the meshing of the carriage return clutch members 460 and 461, to cause the carriage to be motor returned rightwardly as seen from the front of the machine. As will become evident later, power returns of the carriage are terminated automatically under control of the carriage.

The machine provides for automatic institution of carriage returns under control of the carriage, and this, so far as it is thought necessary for an understanding of the invention, will presently be described.

Referring more particularly to Figures 1 and 10, a stud 480 on the frame-work of the machine, has rockably supported thereon a unitary structure designated by the general reference numeral 482. This unitary structure 482 includes a horizontal arm 484 which at its left end carries a forwardly reaching stud 493 having an operative connection with the clutch closing slide 473 at 494. It will be seen that if the unitary structure 482 is rocked clockwise as viewed from the front, it will close the clutch 460, 461. Conversely, if the unitary structure 482 is rocked anti-clockwise, the same clutch will be opened. The said unitary structure 482 is oppositely rockable under control of the carriage, and to this end includes a rightwardly extending arm 488 having a rearward projection 500 formed with an up-reaching and a down-reaching lug, 501 and 502, respectively. These lugs are engageable for clockwise and anti-clockwise rocking of the unitary structure 482 respectively by return instituting elements R1, R2, and return terminating elements RT1 and RT2. Referring to Figures 1 and 10, the lugs 501 and 502 are normally situated in a vertical plane which is common with the carriage return instituting element R2 and the carriage return terminating element RT2. The various return instituting and return terminating elements are adjustably carried upon a bar 504 extending intermediate of the two carriage ends 15 at the rear. They may be given any position along the bar 504 and for that purpose are carried upon individual securing devices indicated at 505 in Figure 1. When during carriage advance the control element R2 encounters the lug 501, the unitary structure will receive a clutch closing motion about the stud 480. Conversely, as the return terminating element RT2 during an instituted return engages the lug 502, the return will be automatically terminated, said unitary structure 482 effecting the shift of the clutch 460, 461, to open condition. The unitary structure 482 has associated therewith a spring-pressed detenting element 520 which is effective to hold it in either open or closed clutch position.

The unitary structure 482 is adapted to be given a position rearwardly of that shown in Figure 1 and the lugs 501, 502, will then be in cooperative range with the return instituting and return terminating elements R1 and RT1, respectively, thereby to cause automatic return from a position in advance of the return instituting element R2, and to cause also earlier return termination. The illustrated specific provision and arrangement of the elements R1, R2, RT1 and RT2 is to be considered exemplary only, and there may be additional such elements as disclosed in said application No. 679,722.

The unitary structure 482 is placeable in its rearward position by operation of a key 527 which, although marked shuttle key in the drawings, may be more properly named a "Return control modifier." The key 527 is on the front end of a lever 528 which when operated imparts a turning movement to a shaft 529 having at the left extremity a down-reaching arm 531. An arm 533, loosely pendant from a shaft in the machine, carries a pin 534 which reaches rightwardly in front of the arm 531, and leftwardly into a slot 535 of a rearwardly extending link 536, the pin 534 having a retainer head for the link. At the rear, the link 536 is supported for fore-and-aft sliding movement in the frame, in a manner not shown, and has a rightward reach 537 in communication with a notch provided in the clutch shifting stud 493 of the unitary rocker structure 482. A light spring 540 constantly urges the arm 533 and therefore also the unitary structure 482, rearwardly. A relatively stronger return spring 541 associated with the key lever 528, is capable and normally overcomes the power of the spring 540, so that normally, as seen in Figure 10, the rocking structure 482 is in its forward position; a spring 542 arranged between the link 536 and the arm 533 provides a resilient connection therebetween which causes the rocking structure to be drawn to normal position by the spring 541.

It will thus be seen that by depressing the shuttle key, the unitary structure 482 will assume a rearward position placing the lugs 501 and 502 in the operating plane of the control elements R1 and RT1. The rocking structure 482 is caused to reassume its forward, normal position in a manner disclosed in the said application No. 679,722 but the manner in which this is accomplished need not be known in connection with the present invention.

It is understood that the return instituting and the return terminating elements are all operative upon the lugs 501, 502 by camming action, and that these elements allow over-travel of the carriage beyond the control positions defined thereby. Thus incident to any return institution by carriage travel, the carriage is brought to a stop and is reversed by the return driving mechanism, and not by any stopping engagement of the lug 501 with either of the described return instituting elements R1, R2. The carriage return instituting elements are usually arranged to function as the carriage is tabulating out of a column defined by one or another of the columnar control magazines 20.

According to one main feature of the invention the power-return mechanism for the carriage includes means whereby the carriage is set in motion through the medium of elastic means providing shock-less pick-up of the carriage; such means is provided to function effectively whether the carriage is returned after being stationary or while executing a tabulating movement.

The setting in motion of the carriage 10 requires considerable effort, and said elastic means provides for a start of the carriage on its return without undue strain on the motor, besides starting it smoothly and without objectionable shock and noise. Referring particularly to Figures 3, 4, 5 and 6, inclusive, all of which are views showing the mechanism turned over 180° in the direction of movement of the carriage, the carriage return rack 463 is set in motion substantially immediately by the carriage return gear 462 after the carriage return clutch 460, 461 has been closed. However, the heavy carriage 10 is set in motion relatively gradually by reason of the rack 463 on the carriage having an elastic motion transmitting connection with the carriage, in the form of heavy springs 560. More particularly, the carriage return rack 463 is provided with a series of slots 561 at spaced locations therealong for guiding movement longitudinally of the carriage by bushings 562 that are carried and held fast on the carriage by means of screws 563 and 563a. By reason of the springs 560, the rack is normally movable on the carriage in carriage return direction only, as seen in Figures 3 and 4, and also in Figures 7 and 8. Each of the springs 560 has one end anchored to a pin 564 on the return rack 463, and has the other end attached to an anchorage plate 565 which is connected with the carriage by a shouldered bushing 566 underlying one of the bushings 562 and firmly united with the latter and the carriage by one of the screws 563. A reduced portion of the bushing 566 is contained in a hole of the plate and spaces the head of the screw 563 with a slight clearance from the plate so that the plate is not clamped tight. From the drawings it will be seen that there are fewer springs 560 and plates 565, than there are rack-guiding slots 561. The bushings 562 are of eccentric form and have enlarged hexagon heads 568 for turning them and thereby to adjust the rack transversely of the carriage, at spaced locations, into proper mesh with the carriage return gear 462. The normal lengthwise position of the rack on the carriage is determined under the influence of the springs 560 by stop-forming bushings 571 of fibrous or other sound-deadening material contained in slots 572 provided in the plates 565, and held fast on the carriage rail bar 13 by screws 570. The limits of movement established by the bushings 571 in conjunction with the slots 572 prevent the rack-guiding bushings from ever contacting the opposite ends of the slots 561.

When the carriage return is instituted, either with the carriage at rest or in tabulating motion, the carriage will not immediately commence to travel in carriage return direction, but the springs 560 will stretch to some extent until the inertia of the carriage has been overcome. This is after the rack has been drawn an indefinite but short distance along the carriage, as illustrated in Figures 5 and 6. Then gradually the carriage recovers its normal position relatively to the rack under the urge of the strained springs 560, the latter of which are carefully chosen to strain initially but to recover thereupon as the inertia of the carriage is gradually overcome.

Return movement of the carriage commences at a point where the force of the stretched springs 560 is balancing the combined force of the carriage advancing spring 17 and the inertia of the carriage, the reversal of motion being effected smoothly and without objectionable and harmful jar.

Several friction elements 574 are associated with the carriage rack 463 to slow down or impede the movement of the carriage as the latter reassumes normal relation with the rack after the springs 560 start to recover. This is to reduce shock and noise at this reverse phase of operation. The friction elements 574 are in the form of bowed spring leaves clamped to the carriage by the screws 563a along with the associated bushings 562. Said friction elements bear under tension against the carriage return rack, as at 573. The aggregate friction exerted causes the carriage to recover its normal position relatively to the rack at a pace slow enough to minimize the impact of the plates 565 at the slots 572 against the fiber bushings 571. The friction element 574 has lugs 575 in slidable contact with the rack 463 to prevent turning on the screw. Inasmuch as the inertia of the heavy carriage is considerable, the relatively light friction of the elements 574 against the rack exerts no appreciable influence to urge the carriage to move with the rack at the outset of the carriage return operation.

By way of example, there is shown in Figure 2 a work-sheet 45 having a plurality of columns including a first column 46, a penultimate column 47 and a final column 48. Function control magazines 20 are schematically represented in association with said work-sheet and determine the tabulating positions of the carriage in connection with the different columns thereon. Only the magazine 20 that is associated with the final column is shown equipped with an automatic cycle tripping tappet 23. This tappet may institute an automatic cycle for the taking of an automatic total in the final column. The amounts entered in all, except the final column, are key indexed, and the machine cycles necessary in connection therewith are instituted under control of the usual cycle key, not shown. Appropriate function control tappets 24 on the various magazines 20 provide that in the various columns one or more desired registers are active, either additively or subtractively, and that in the final column a total is taken from one register.

The structure in the commercial Sundstrand machine requires a reloading of the transfer mechanism prior to the taking of a total printing cycle. In the example of work shown in Figure 2, the reloading of the transfer mechanism in preparation to the total printing cycle in the final column 48 is assumed to have taken place in a preceding column wherein the register from which the total is finally taken is inactive. This may be in the penultimate column 47.

Due to the requirement in the Sundstrand machine for a reloading of the transfer mechanism preparatory to the automatic taking of a total of a certain register, it may in some instances be necessary to provide an extra function control magazine directly preceding the total printing column for automatically cycling the machine for this purpose.

In any event, the machine cycles automatically in the total printing column, and the carriage tabulating escapement 18, 21 is consequently operated, wherefore the carriage advances beyond the final column. In doing so the return instituting element R2 encounters the lug 501, thereby depressing it and causing the carriage return clutch 460, 461 to close. The dot and dash line 49 in Figure 2 represents the tabulating and return motion executed by the carriage following a total printing operation in the final column 48, and the point 49ª on this line indicates where the carriage return clutch is closed.

The work may, however, require additional postings in an additional line before the printing of a total in the final column 48. This calls for a return of the carriage from the penultimate column 47. To condition the machine for this, the aforedescribed shuttle key 527 is operated at any time prior to cycling the machine in the penultimate column. This will place the lug 501 into cooperative range with the return instituting element R1, which is so located that the carriage in tabulating a little past the penultimate column will automatically cause a return to the second column. The dot and dash line 49ᵇ in Figure 2 represents the motion executed by the carriage in this case, and the point 49ᶜ indicates where the carriage return clutch is closed.

It will be noted that if the magazine 20 of the final colmn 48 is closely located to that of the penultimate column, the tabulating movement of the carriage is likely to be of sufficient magnitude to cause the cycle trip tappet 23 to reach the cycle trip selector 28 before the actual return movement of the carriage commences to get under way, it being remembered that the carriage is picked up resiliently with a lag. But a cycle must not occur while the carriage is returning, since this is undesirable and might tie up and damage the machine, as already stated. Accordingly, it is conceived to provide against effective operation of the cycle selector 28 whenever the carriage return clutch receives a closing movement.

Referring now to the rear view of Figure 7, it will be perceived that if the clutch closing rocker 482 is assumed to be in its normal, forward position, the next tabulating movement will cause a cycle to be instituted by reason of the cycle lug 23 engaging the cam element 29, and further that in consequence of a cycle so instituted the carriage will tabulate a short distance past the final column and that the return instituting element R2 will consequently become active on the rocker 482 to close the carriage return drive. Still referring to Figure 7 it will also be perceived that if the rocker 482 is assumed to have been moved to its rearward position through operation of the shuttle key, for making additional postings as explained above, the next tabulating movement of the carriage ensuing upon the cycling of the machine will cause the carriage return clutch 460, 461 to close by the coaction of the return instituting element R1 with the lug 501, see Figure 8. For a short time thereafter the carriage will continue to proceed in tabulating direction due to the elastic pick-up provision between the carriage return rack 463 and the carriage, as well as for the reason that the carriage return drive includes preferably also a slip clutch, not shown. The carriage may therefore tabulate to or past the position illustrated in Figure 9 wherein the cycle trip tappet 23 is shown as having reached and depressed the cam element 29 of the cycle instituting selector 28. In Figure 9 the elastic or spring means 560 has been strained and at the next instant the carriage reverses its motion shocklessly.

It is a feature of the invention to eliminate the possibility of a cycle after the carriage return drive is closed and while the carriage may yet be proceeding in tabulating direction and consequently a cycle instituting tappet 23 may advance over the cam element 29. To this end the cycle tripping selector 28 is blocked against effective operation whenever the carriage return clutch 460, 461 is closed. Specifically, see particularly Figures 7 to 9, there is arranged upon a frame supported stud 50 a blocking element 51 in the form of an upright lever. This blocking element 51 has an upper end which is normally clear of a protuberance 52 reaching downwardly from the cycle selector lever 31. Said lever or blocking element 51 is connected to the rocking structure 482 of the carriage return clutch closing mechanism by a link 53. So long as the clutch is open, as seen in Figure 7, the selector lever 31 with its protuberance 52 is free to descend. However, when the structure 482 is rocked to close the carriage return drive, either by control of the elements R1, R2 on the carriage or by the carriage return key 468, the blocking element 51 will be rocked to place its upper end underneath the protuberance 52, see Figure 8. If then, due to continued tabulating movement of the carriage, a cycle tripping tappet 23 should ride onto the camming element 29, as depicted in Figure 9, the result will be that the cam element will be idly operated, inasmuch as the selector lever 31 is blocked, and inasmuch as the spring 36 allows idle depression of the cam element and its supporting arm 34. The joints at opposite ends of the link 53 are sufficiently loose to permit the unitary rocking structure 482 to be moved freely fore-and-aft as required.

The aforedescribed safety feature permits close arrangement of the columns in a machine wherein the motion of the carriage is not immediately reversed at the closure of the carriage return drive, and particularly wherein provision is made for the return drive to pick up the load carriage by a yielding provision.

Obviously, the described incapacitating means for the cycle selector is operative whether the carriage return clutch is closed under carriage control or by operation of the carriage return key 468.

Moreover, the mechanism is of a construction so that upon depression of the cycle tripping selector 28, as illustrated in Figure 11, it is impossible to rock the carriage return clutch closing structure 482 to closed clutch position, inasmuch as then the selector protuberance 52 is blocking the blocking lever 51 in normal position.

What is claimed is:

1. In a business machine having a carriage movable in advance and in return direction on a frame, means to tabulate the carriage in advance direction, including impositive carriage advancing means, normally ineffectively conditioned power-means for returning the carriage, including, a motor-operable gear on the frame, a rack-bar associated with said gear for endwise movement thereby to return the carriage, and elastic means to transmit carriage returning motion from said rack-bar to the carriage, and means oppositely on the carriage and the frame to effectively condition said power-means in response to the carriage tabulating past a certain position, but without itself halting the carriage, said elastic means being resilient enough to strain as the power-means acts initially against the inertia of the carriage, but being strong enough to overcome subsequently the inertia of the carriage to drive the carriage in return direction.

2. In a business machine having a carriage movable in opposite directions on a frame, means constantly urging the carriage to move in one direction, tabulating means normally in control of the carriage, operable to cause the urging means to tabulate the carriage in said one direction, normally ineffectively conditioned power-means for driving the carriage in the other direction, and including elastic motion transmitting means, and means to condition said power-means for driving the carriage, said elastic means being weak enough to be strained from a normal condition as the power-means initially acts against the inertia of the carriage, but being strong enough to overcome gradually the inertia of the carriage and then to recover normal condition while at the same time driving the carriage in said other direction.

3. In a business machine having a carriage of considerable mass movable in opposite directions, a member movable in one of said directions for driving the carriage in this direction, means to power-move the member in at least said one direction, means including elastic means to transmit movement from said member to the carriage in said one direction, said elastic means being weak enough to strain transitorily at the outset of the power movements imparted to the member and allowing the carriage to lag behind, but being strong and elastic enough to overcome gradually the inertia of the carriage and to cause the carriage to catch up with the member after considerable movement of the latter, and means to control the speed of movement with which the carriage is able to catch up with the member.

4. In a business machine having a carriage of considerable mass movable in opposite directions, a bar movable endwise in one of said directions for driving the carriage in this direction, means to power-move the bar in at least said one direction, means including elastic means to transmit movement from said bar to the carriage in said one direction, said elastic means being weak enough to strain transitorily at the outset of the power movements imparted to the bar and allowing the carriage to lag behind, but being strong and elastic enough to overcome gradually the inertia of the carriage and to cause the carriage to catch up with the bar after considerable movement of the latter, and friction means between the bar and the carriage to control the speed of movement with which the carriage is able to catch up with the bar.

5. In a business machine having a carriage of considerable mass movable in advance and return directions, means constantly urging the carriage in advance direction, means normally holding the carriage at rest against advance, operable to cause tabulating runs thereof under the influence of said urging means, a rack-bar movable endwise in carriage return direction, means including a gear associated with the rack-bar, to power-move the latter in return direction, spring means to transmit motion from said rack-bar in carriage return direction to the carriage, said spring means being weak enough to strain at the outset of the power movements imparted to the rack-bar and while the carriage may be either at rest or executing a tabulating run, thus allowing the carriage to lag behind with respect to the movement of the rack-bar in return direction, and strong enough to overcome gradually the inertia of the resting or tabulating carriage after some power movement of the rack-bar in return direction, and being also strong enough to cause the carriage to catch up with the rack-bar after considerable movement of the latter, and means to control the speed with which the carriage can catch up with the rack-bar.

6. The combination in a business machine comprising, machine cycling means, a carriage advanceable in tabulating movements in one direction to different columnar positions, and cycle instituting means operated automatically incident to a tabulating advance of the carriage in reaching a certain cycle instituting point; of normally ineffectively conditioned power-return means for the carriage, embodying elastic means for transmitting motion to the carriage, means to condition said power-return means for operation while the carriage may be approaching and subsequently reaching said cycle instituting point, said elastic motion transmitting means being weak enough to strain initially after the power-return means is conditioned for operation, and thus allowing momentary continued tabulating travel of the carriage, permitting the latter to reach said cycle instituting point before imparting return movement to the carriage, and means operated automatically in consequence of the conditioning of the power-return means for operation, to incapacitate said carriage-controlled cycle instituting means.

7. The combination in a business machine comprising, machine cycling means, a carriage advanceable in tabulating movements in one direction to different columnar positions, and cycle instituting means operated automatically incident to a tabulating advance of the carriage in reaching a certain cycle instituting point; of normally ineffectively conditioned power-return means for the carriage, embodying elastic means for transmitting motion to the carriage, means to condition said power-return means for operation while the carriage may be approaching and subsequently reaching said cycle instituting point, said elastic motion transmitting means being weak enough to strain initially after the power-return means is conditioned for operation, and thus allowing momentary continued tabulating travel of the carriage, permitting the latter to reach said cycle instituting point before imparting return movement to the carriage, the automatic cycle instituting means of the machine comprising, a member adapted for cycle instituting operation, and impositive operating means therefor, and means operated automatically in consequence of said conditioning of the power-return means, to block said member against effective operation.

8. The combination in a business machine comprising, machine cycling means, a carriage advanceable in tabulating movements in one direction to different columnar positions, and cycle instituting means operated automatically incident to a tabulating advance of the carriage in reaching a certain cycle instituting point; of normally ineffectively conditioned power-return means for the carriage, embodying impositive means for transmitting motion to the carriage, means to condition said power-return means for operation, said impositive motion transmitting means allowing momentary continued tabulating travel of the carriage after the conditioning of the power-return means, permitting the carriage to reach said cycle instituting point before imparting return movement to the carriage, and means operated automatically in consequence of the conditioning of the power-return means to incapacitate the carriage-controlled cycle instituting means.

9. The combination in a business machine comprising, machine cycling means, a carriage advanceable in tabulating movements in one direction to different columnar positions, and cycle instituting means operated automatically incident to a tabulating advance of the carriage in reaching a certain cycle instituting point; of normally ineffectively conditioned power-return means for the carriage, embodying elastic means for transmitting motion to the carriage, carriage controlled means to condition said power-return means for operation in response to a tabulating movement in approach of said cycle instituting point, said elastic motion transmitting means being weak enough to strain initially after the power-return means is conditioned for operation, and thus allowing momentary continued tabulating travel of the carriage, permitting the latter to reach said cycle instituting point before imparting return movement to the carriage, and means operated automatically in consequence of the conditioning of the power-return means for operation, to incapacitate said carriage-controlled cycle instituting means.

10. The combination in a business machine comprising, machine cycling means, a carriage advanceable in tabulating movements in one direction to different columnar positions, and cycle instituting means operated automatically incident to a tabulating advance of the carriage in reaching a certain cycle instituting point; of normally ineffectively conditioned power-return means for the carriage, embodying elastic means for transmitting motion to the carriage, means to condition said power-return means for operation, said elastic motion transmitting means being weak enough to strain initially after the power-return means is conditioned for operation, and thus allowing momentary continued tabulating travel of the carriage, permitting the latter to reach said cycle instituting point before imparting return movement to the carriage, and means operated automatically in consequence of the conditioning of the power-return means for operation, to incapacitate said carriage-controlled cycle instituting means.

11. The combination in a business machine comprising, a machine cycling means, a carriage advanceable in tabulating movements in one direction to different columnar positions, and carriage-controlled cycle instituting means; of normally ineffectively conditioned power-return means for the carriage, embodying elastic means for transmitting motion to the carriage, means to condition said power-return means for operation, and automatically operative means to incapacitate said carriage-controlled cycle instituting means incidental to the conditioning of said power-return means, and to incapacitate said power-return conditioning means incidental to the operation of said cycle instituting means by control of the carriage.

12. The combination in a business machine comprising, a machine cycling means, a carriage advanceable in tabulating movements in one direction to different columnar positions, and carriage-controlled cycle instituting means; of normally ineffectively conditioned power-return means for the carriage, embodying elastic means for transmitting motion to the carriage, means to condition said power-return means for operation, and automatically operative means to block said carriage-controlled cycle instituting means against operation incidental to the conditioning of said power-return means, and to block said power-return conditioning means against conditioning operation incidental to the operation of said cycle instituting means by control of the carriage.

13. In a business machine having a carriage movable in opposite directions on a frame, means constantly urging the carriage to move in one direction, tabulating means normally in control of the carriage, operable to cause the urging means to tabulate the carriage in said one direction, normally ineffectively conditioned power-means for driving the carriage in the other direction, and including elastic motion transmitting means, means to condition said power-means for driving the carriage, said elastic means being weak enough to be strained from a normal condition as the power-means initially acts against the inertia of the carriage, but being strong enough to overcome gradually the inertia of the carriage and then to recover normal condition while at the same time driving the carriage in said other direction, and means to control the speed at which the elastic means recovers normal condition.

14. In a business machine having a carriage of considerable mass movable in advance and return directions, means constantly urging the carriage in advance direction, means normally holding the carriage at rest against advance, operable to cause tabulating runs thereof under the influence of said urging means, a bar movable endwise in carriage return direction, means to power-move said bar in return direction, means to render said power-moving means effective in response to a tabulating run of the carriage, key means, means responsive to said key means to render said power-moving means effective, and means including elastic means to transmit motion from said bar in carriage return direction to the carriage, said elastic means being weak enough to strain from a normal condition at the outset of the power movements imparted to the bar and while the carriage may be either at rest or executing a tabulating run, thus allowing the carriage to lag behind with respect to the movement of the bar in return direction, but being strong enough to overcome gradually the inertia of the resting or tabulating carriage after some power movement of the bar in return direction, the elastic means recovering normal condition while at the same time driving the carriage in return direction.

15. The combination in a business machine comprising, a frame, a machine cycling means, a carriage advanceable in tabulating movements in one direction on said frame to different columnar positions, and cycle instituting means comprising tappets on the carriage and means on the frame operable by said tappets to institute cycles; of normally ineffectively conditioned power-return means for the carriage, embodying impositive means for transmitting return motion to the carriage, and means to condition said power-return means for operation and concomitantly to condition said cycle instituting means for ineffectiveness of the tappets on the operable means.

16. The combination in a business machine comprising, a frame, a cycling means, a carriage advanceable in tabulating movements in one direction on said frame to different columnar positions, and carriage-controlled cycle instituting means comprising cycle-instituting tappets on the carriage and means on the frame operable by said tappets to institute cycles; of normally ineffectively conditioned power-return means for the carriage, embodying elastic means for transmitting motion to the carriage, and means to condition said power-return means for operation and concomitantly to block said operable means of the cycle instituting means against operation.

WALTER A. ANDERSON.

REFERENCES CITED

The following references are of record in the file of this patent:

UNITED STATES PATENTS

| Number | Name | Date |
|---|---|---|
| 1,580,534 | Rinsche | Apr. 13, 1926 |
| 1,582,788 | Schluns | Apr. 27, 1926 |
| 1,901,135 | Sundstrand | Mar. 14, 1933 |
| 2,082,098 | Christian | June 1, 1937 |
| 2,451,631 | Moellenbeck et al. | Oct. 19, 1948 |